(12) United States Patent
Matsushima (10) Patent No.: US 8,548,128 B2
(45) Date of Patent: Oct. 1, 2013

(54) TELEPHONE APPARATUS, IMAGE DISPLAY METHOD AND IMAGE DISPLAY PROCESSING PROGRAM

(75) Inventor: Mika Matsushima, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 281 days.

(21) Appl. No.: 12/719,632

(22) Filed: Mar. 8, 2010

(65) Prior Publication Data

US 2010/0226485 A1     Sep. 9, 2010

(30) Foreign Application Priority Data

Mar. 9, 2009 (JP) ................... 2009-055602

(51) Int. Cl.
  *H04M 1/64*     (2006.01)
(52) U.S. Cl.
  USPC ............ 379/88.11; 379/88.13; 379/93.17; 379/144.08; 455/415
(58) Field of Classification Search
  USPC ............ 379/88.11, 88.12, 88.23, 100.01, 379/142.04, 88.13, 93.17, 93.23, 136, 144.08, 379/167.12, 201.04, 247; 358/1.1; 455/414.1, 455/415
  See application file for complete search history.

(56) References Cited

U.S. PATENT DOCUMENTS

| | | | | |
|---|---|---|---|---|
| 8,310,687 | B2 * | 11/2012 | Kunii | ............................ 358/1.1 |
| 2007/0081643 | A1 * | 4/2007 | Divine | ..................... 379/100.01 |
| 2008/0254783 | A1 | 10/2008 | Kim et al. | |

FOREIGN PATENT DOCUMENTS

| | | |
|---|---|---|
| JP | 2000-078265 A | 3/2000 |
| JP | 2001-021776 A | 1/2001 |
| JP | 2001-148885 A | 5/2001 |
| JP | 2006-094190 A | 4/2006 |
| JP | 2006-345424 A | 12/2006 |
| JP | 2007-159155 A | 10/2007 |
| JP | 2007-259155 A | 10/2007 |
| JP | 2007-312262 A | 11/2007 |
| JP | 2008-263602 A | 10/2008 |
| WO | 2006/121123 A1 | 11/2006 |

OTHER PUBLICATIONS

Japan Patent Office, Notification of Reasons for Refusal for Japanese Patent Application No. 2009-055602 (counterpart Japanese patent application), dispatched Aug. 28, 2012.

European Patent Office, extended European Search Report for European Patent Application No. 10250385.1 (counterpart European patent application), dated Dec. 7, 2012.

* cited by examiner

*Primary Examiner* — MD S Elahee
(74) *Attorney, Agent, or Firm* — Baker Botts L.L.P.

(57) ABSTRACT

A telephone apparatus includes a storage unit, a display unit, a retrieving unit and a display control unit. The storage unit is configured to store a plurality of images therein. The display unit is configured to display at least one of the plurality of images. The retrieving unit is configured to retrieve a relating image from the images stored in the storage unit when an outgoing call is made to or an incoming call is received from other telephone apparatus through a telephone line. The relating image relates to a corresponding image associated with the other party of the outgoing or incoming call. The display control unit configured to perform control to display at least one of the corresponding image and the retrieved relating image on the display unit.

20 Claims, 5 Drawing Sheets

| IMAGE ID | PHOTOGRAPHING DATA AND TIME | GPS LATITUDE | GPS LONGITUDE | NON-DISPLAY FLAG |
|---|---|---|---|---|
| KIF-0010 | 2006/10/13 11:20:08 | NORTH LATITUDE 32° 52' 6.0" | EAST LONGITUDE 131° 37' 23.1" | OFF |
| KIF-0011 | 2006/10/13 11:32:45 | NORTH LATITUDE 32° 52' 8.1" | EAST LONGITUDE 131° 37' 37" | ON |
| KIF-0012 | 2006/10/13 12:30:20 | NORTH LATITUDE 32° 52' 15" | EAST LONGITUDE 131° 37' 41.2" | OFF |
| ... | ... | ... | ... | ... |
| DSC-1000 | 2006/12/25 18:20:10 | NORTH LATITUDE 35° 15' 15" | EAST LONGITUDE 139° 22' 10.0" | OFF |
| ... | ... | ... | ... | ... |

FIG. 3

| TELEPHONE NUMBER | REGISTRATION ID | NAME | REGISTRATION IMAGE ID |
|---|---|---|---|
| 03-0111-XXXX | 0 | ICHIRO | KIF-0011 |
| 02-4444-XXXX | 1 | TARO | DSC-2000 |
| ... | ... | ... | ... |

TELEPHONE APPARATUS, IMAGE DISPLAY METHOD AND IMAGE DISPLAY PROCESSING PROGRAM

CROSS-REFERENCE TO RELATED APPLICATIONS

This application claims priority from Japanese Patent Application No. 2009-055602 filed on Mar. 9, 2009, the entire contents of which are incorporated herein by reference.

TECHNICAL FIELD

The present invention relates to a telephone apparatus configured to display an image on an incoming from or outgoing call to other telephone apparatus, an image display method and an image display processing program.

BACKGROUND

In a related-art telephone apparatus in which an image such as a face photograph is registered corresponding to another party registered in a telephone book, and when an incoming call is received from another party registered in the telephone book, an image corresponding to the calling party is displayed. Accordingly, a visual effect can be improved and the calling party can be easily recognized.

However, in the above described related art, since the image to be displayed is fixed for every transmitting calling party and the same image is displayed every time if the transmitting calling party is the same, the user may gradually become discontent. Further, in order to change the image so as to solve this problem, a laborious image change registration operation is required for the image correspondence.

SUMMARY

The present invention was made in view of the above circumstances, and an object thereof is to provide a telephone apparatus, an image display method and an image display processing program in which a laborious registration operation is not required and different images can be displayed every time as images relating to the other party to prevent a user from becoming discontent with the displayed image.

According to an aspect of the invention, there is provided a telephone apparatus comprising: a storage unit configured to store a plurality of images therein; a display unit configured to display at least one of the plurality of images; a retrieving unit configured to retrieve a relating image from the images stored in the storage unit when an outgoing call is made to or an incoming call is received from other telephone apparatus through a telephone line, the relating image which relates to a corresponding image associated with the other party of the outgoing or incoming call; and a display control unit configured to perform control to display at least one of the corresponding image and the retrieved relating image on the display unit.

According to another aspect of the invention, there is provided an image display method for a telephone apparatus that comprises a storage unit configured to store a plurality of images and a display unit configured to display the images, said method comprising: retrieving a relating image from the images stored in the storage unit when an outgoing call is made to or an incoming call is received from other telephone apparatus through a telephone line, the relating image which relates to a corresponding image associated with the other party of the outgoing or incoming call; and performing control to display at least one of the corresponding image and the retrieved relating image on the display unit.

According to yet another aspect of the invention, there is provided a computer readable medium having an image display processing program readable by a computer and enabling, when executed by the computer, the computer to perform operations of the telephone apparatus that comprises a storage unit configured to store a plurality of images and a display unit configured to display the images, said operation comprising: retrieving a relating image from the images stored in the storage unit when an outgoing call is made to or an incoming call is received from other telephone apparatus through a telephone line, the relating image which relates to a corresponding image associated with the other party of the outgoing or incoming call; and performing control to display at least one of the corresponding image and the retrieved relating image on the display unit.

According to the aspect of the invention, a relating image which relates to the corresponding image which corresponds in advance to the other party is retrieved from images stored in the storage unit when an outgoing call is made to or an incoming call is received from any other telephone apparatus, and at least one image of the corresponding image and the relating image is displayed on the display unit. If the image relating to the other party corresponds as the corresponding image, it is highly probable that the relating image which relates to the corresponding image is also an image which relates to the other party. Further, if the contents of the storage unit vary from the previous retrieving time due to additional storage, deletion or the like of the image, the retrieving result of the image which relates to the corresponding image may also vary from the previous retrieving time. Accordingly, if a user additionally stores some images in the storage unit, a relating image is newly retrieved from the images. Further, if at least one image which is stored in the storage unit is deleted, in the case that the relating image was among in the deleted images, the image is not retrieved next time. That is, in order to vary the image to be displayed in the display unit, even though the user does not perform a laborious registration process for making the relating image correspond to the other party, the relating image may be retrieved and may be displayed in the display unit with the storage unit being in an updated storage state, thereby preventing the user from becoming discontent with the displayed image.

DESCRIPTION

Hereinafter, an exemplary embodiment of the invention will be described with reference to the accompanying drawings, in which the invention is exemplified to a telephone.

1. Configuration and Function of Telephone

Figure 1:
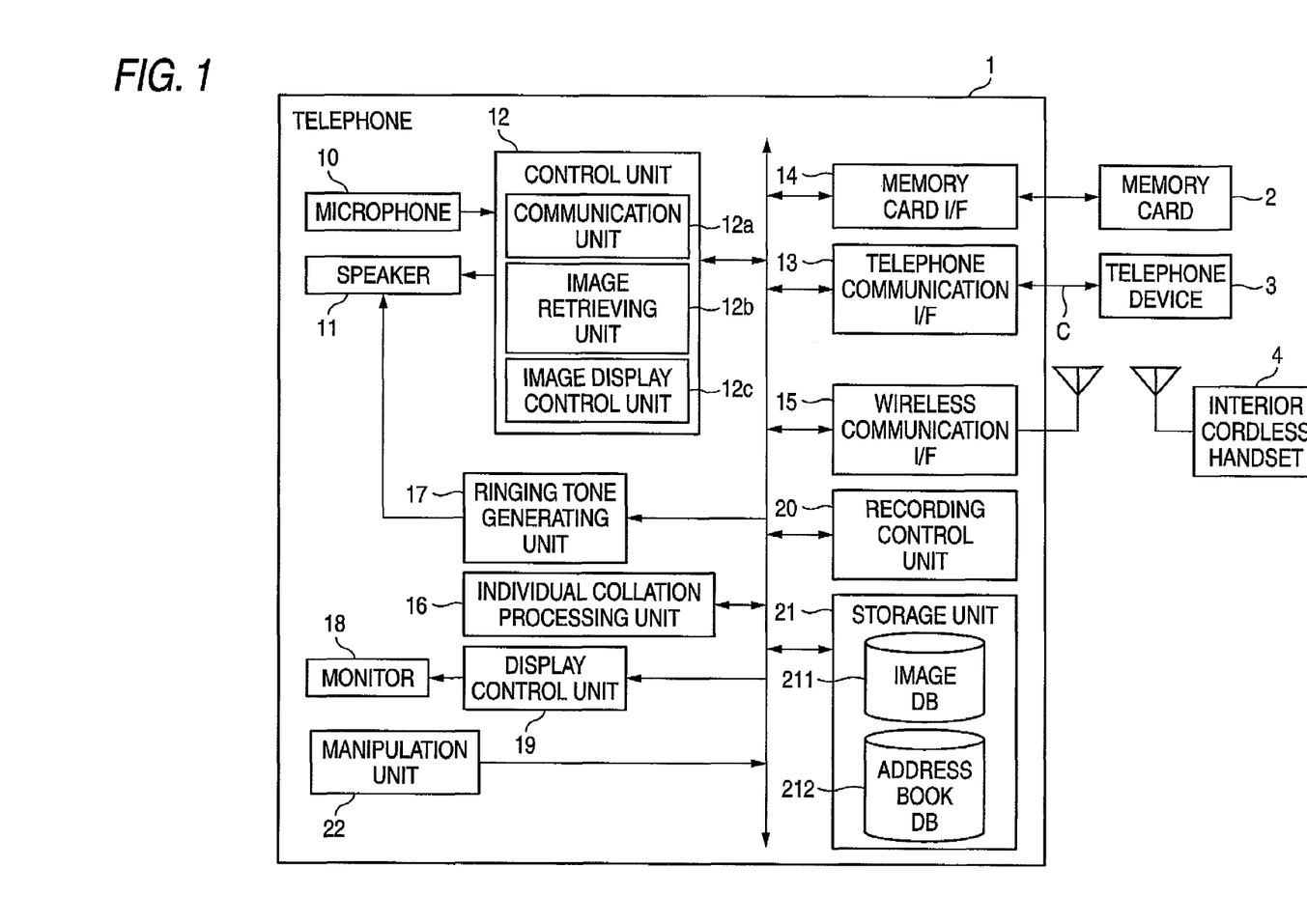
FIG. 1 illustrates an example of a schematic configuration of a telephone according to an embodiment of the invention.

Firstly, configuration and function of a telephone according to an embodiment will be described with reference to FIG. 1.

In the telephone 1, an image such as a photograph which corresponds to a person who is registered in an address book (hereinafter, referred to as a "registrant") is registered, and a plurality of images which includes the image which corresponds to the registrant (hereinafter, referred to as a "registration image") and an image which relates to the registration image (hereinafter, referred to as a "relating image") is displayed on a monitor screen, when an outgoing call is made to or an incoming call is received from the registrant. The relating image in the embodiment includes an image in which the registrant appears (in the case that the registrant appears in the registration image) and an image which is photographed together when the image in which the registrant appears is photographed.

In order to realize such a function, the telephone 1 includes a microphone 10, a speaker 11, a control unit 12, a telephone communication I/F 13, a memory card I/F 14, a wireless communication I/F 15, an individual collation processing unit 16, a ringing tone generating unit 17, a monitor 18 made of a liquid crystal display panel or the like (an example of the display unit), a display control unit 19, a recording control unit 20, a storage unit 21 made of a non-volatile semiconductor memory, a hard disc or the like (an example of the storage unit), a manipulation unit 22 having a plurality of manipulation buttons and the like. Herein, the microphone 10 and the speaker 11 are provided in a transmitter/receiver (not shown).

The ringing tone generating unit 17 generates a ringing tone from the speaker 11 according to a command of the control unit 12 if a call signal is received from a telephone device 3.

The display control unit 19 controls the display of the monitor 18 based on a command from the control unit 12.

The recording control unit 20 receives a voice signal of an intended party transmitted from the telephone device 3 through the telephone communication I/F 13, based on the command from the control unit 12, and then records the received voice signal in the storage unit 21.

In the storage unit 21, a plurality of image data is recorded. The image data is stored in, for example, the memory card 2 (for example, an SD (Secure Digital) memory card, a multimedia card, or the like). When the memory card 2 is inserted in the telephone 1, the recording control unit 20 reads the image data through the memory card I/F 14 and stores the read image data into the storage unit 21. Alternatively, when the telephone 1 is connected to a digital camera through a communication cable such as an USB (Universal Serial Bus) cable and the image data which is stored (for example, stored in the memory card 2 which is inserted in the digital camera) in the digital camera is received, the recording control unit 20 stores the received image data into the storage unit 21.

Further, in the storage unit 21 are stored an image database 211 for registering attribute information of the image data and an address book database 212 (an example of registering unit) for registering attribute information of the intended party (registrant) of a user.

Figure 2:
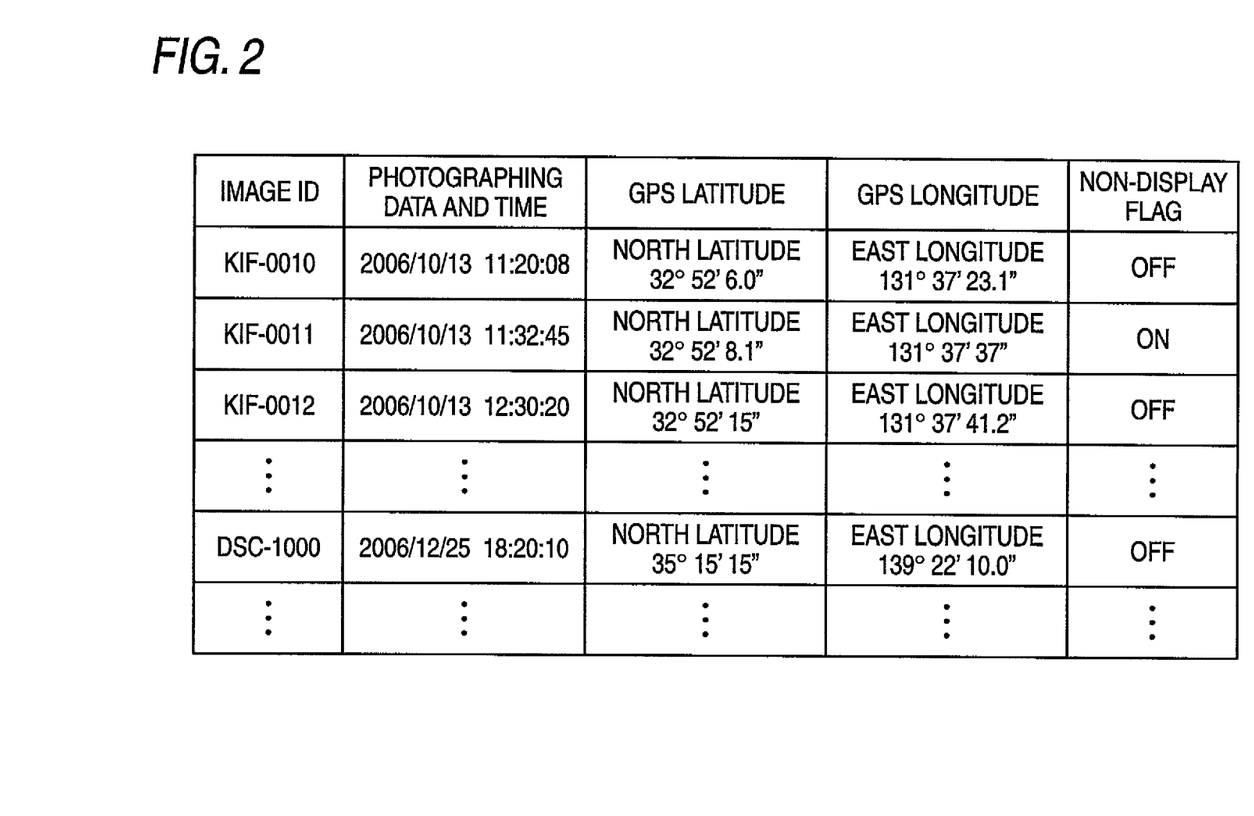
FIG. 2 illustrates an example of a content of information which is registered in an image database according to the embodiment.

As shown in FIG. 2, in the image database 211 are registered as the attribute information, an image ID (an example of camera identification information), photographing date and time (an example of photographing time information), GPS latitude and longitude (an example of photographing location information) and non-display flag, to correspond to each piece of image data which is stored in the storage unit 21.

The image ID is recognition information given to the image data, by a digital camera (including a cellular phone, a notebook personal computer or the like in which a digital camera is installed) used when the image data is generated by photographing. Since the format of the image ID normally varies depending on the type or the like of the digital camera (for example, a camera A is "KIF-xxxx", a camera B is "DSC-xxxx" or the like, (xxxx is a numerical value of any one of 0000 to 9999)), the image data can be recognized by the corresponding image ID, and simultaneously, the digital camera used for photographing can be recognized. When the image data is brought into the telephone 1, the recording control unit 20 may newly assign unique identification information as the image ID for newly received image data and then register the unique identification information into the image database 211.

The photographing date and time is information indicating the date and time at which the image data is generated by photographing. Further, the GPS latitude and longitude is information indicating the latitude and longitude of a photographing location, which, for example, is given for the image data in the case that the digital camera used for photographing has a GPS (Global Position System) positioning function.

The image ID, the photographing date and time, and the GPS latitude and longitude are stored in the memory card 2, for example, together with the image data, and registered in the image database 211 when the image data is stored in the storage unit 21.

The non-display flag is information indicating whether an image corresponding to the flag is displayed as the registration image or the relating image when an outgoing call is made to or an incoming call is received from the registrant. The non-display flag is set to OFF in the case of display, and is set to ON in the case of non-display. Further, an initial value is set to OFF.

Figure 3:
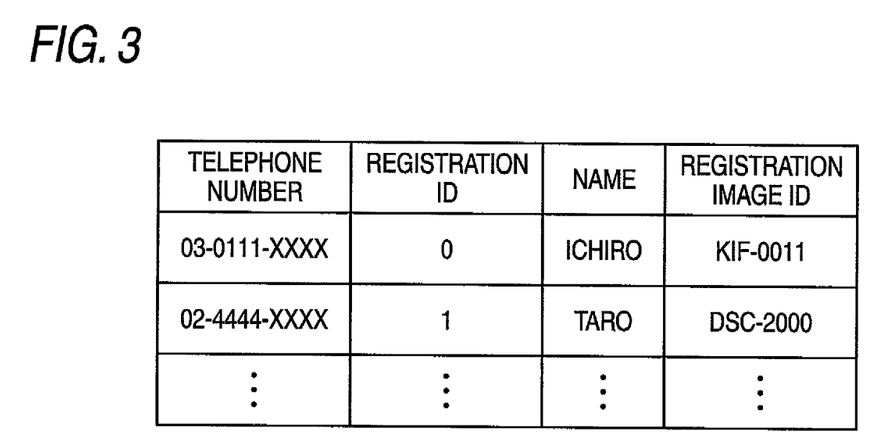
FIG. 3 illustrates an example of a content of information which is registered in an address book database according to the embodiment.

As shown in FIG. 3, in the address book database 212 are registered as attribute information, a telephone number of the registrant, a registration ID as identification information of the registrant, a name of the registrant, a registration image ID, and the like, to correspond to every registrant. Among the information, the telephone number and the name are set by a user.

The registration image ID is the image ID of data of the registration image which is registered corresponding to the registrant by selection of the user (hereinafter, referred to as "registration image data"). In addition, the registration image data is so-called reference image data which is used in an image retrieving process at the time of making an outgoing call to or receiving an incoming call from the registrant. Herein, the registration image data and the relating image data (hereinafter, referred to as "relating image data") become a display target of the monitor 18 at the time of a phone call with the registrant.

The individual collation processing unit 16 collates a transmitter telephone number which is notified from the telephone device 3 of the intended party with a telephone number which is registered in the address book database 212, to specify the intended party.

The control unit 12 is formed by, for example, a microcomputer or the like, and executes a predetermined program (including the image display processing program of the invention) according to the corresponding computer to serve as a communication unit 12a, an image retrieving unit 12b (an example of a retrieving unit) and an image display control unit 12c (an example of a display control unit and extracting unit). For example, the predetermined program may be recorded in a recording medium such as a memory card 2 and read through the memory card I/F 14, and may be downloaded from a server apparatus or the like on the Internet through a telephone line C.

The communication unit 12a performs communication with the telephone device 3 of the intended party through the telephone communication I/F 13 and the telephone line C. For example, at the time of making an incoming call, if a telephone number of a desired intended party for a phone call is dialed by the user manipulating the manipulation unit 22, or if any registrant as the desired intended party for a phone call is selected, the communication unit 12a recognizes the telephone number of the desired intended party and transmits a selection signal including the telephone number through the telephone communication I/F 13. Further, if a response signal is received through the telephone communication I/F 13, the communication unit 12a enters into a phone call state.

In addition, at the time of receiving an incoming call, if a subscriber switching system of a public telephone network inverts the polarities of a line L1 and a line L2 of the telephone line C so as to drive the telephone 1 for a call, the communication unit 12a detects the polarity inversion, and controls the ringing tone generating unit 17 to output the ringing tone to the speaker 11 if a call signal is received through the telephone communication I/F 13. Herein, in the case that the caller's telephone number of the other party is received before the call signal, the communication unit 12a stores the caller's telephone number in an RAM (Random Access Memory) in the control unit 12. Further, if the user picks up the transmitter/receiver (off-hook), the communication unit 12a transmits a response signal through the telephone communication I/F 13, and enters into the phone call state.

In the phone call state, the communication unit 12a imports the voice of the user which is collected by the microphone 10 and transmits a voice signal to the telephone device 3 through the telephone communication I/F 13 and the telephone line C. Meanwhile, the communication unit 12a receives the voice signal (voice signal of the other party for communication) through the telephone communication I/F 13 transmitted through the telephone line C from the telephone device 3 to output the voice signal to the speaker 11. Accordingly, the user can make a phone call with the other party.

As the telephone device 3, a stationary telephone, a cellular phone and a personal computer or the like having an IP phone function are exemplified.

Further, the communication unit 12a performs communication with an interior cordless handset 4 in a wireless manner through the wireless communication I/F 15. Thus, extension line communication between the telephone 1 and the interior cordless handset 4 becomes possible, and simultaneously, communication between the interior cordless handset 4 and the telephone device 3 becomes possible through the telephone 1.

At the time of making an outgoing call or receiving an incoming call, in the case the person (user of the telephone device 3) who is the other party for a phone call is a registrant, the image retrieving unit 12b retrieves image data which relates to the registration image data of the other party.

Specifically, the image retrieving unit 12b obtains a registration image ID corresponding to a telephone number of the other party (hereinafter, referred to as "other party telephone number") from the address book database, and performs face recognition with respect to registration image data indicated by the corresponding registration image ID. For example, the image retrieving unit 12b moves a template indicating a shape of a predetermined face on the image of the registration image data and simultaneously calculates a correlation value between the template and an image region in which the template is located. Further, an image region having a highest correlation value becomes a face region (an example of a target image). Then, the control unit 12 detects the positions of eyes, a nose, a mouth and the like from the detected face region, cuts the face region with constant size and shape out of the positions, and then sets grayscale information thereof to a feature vector. Moreover, to calculate a partial space, the control unit 12 calculates a correlation matrix of the feature vector and an orthonormal vector by K-L expansion (Karhunen-lovee expansion), and sets the partial space to the feature data of the face.

Herein, in the case that the plurality of registration image IDs is registered in response to the other party telephone numbers, that is, in the case that the plurality of registration image data is registered, the image retrieving unit 12b selects one piece of registration image data in which the face can be easily recognized among the registration image data. For example, the image retrieving unit 12b image-interprets each registration image data to extract a face portion of a person and calculates an area (the number of pixels) occupied by images of the face portion. Moreover, the control unit 12 selects the registration image data having the broadest area occupied by the images of the face portion as the image data in which the face can be easily recognized.

Further, the image retrieving unit 12b performs the same face recognition for the image data in which the attribute information is registered in the image database 211 to calculate feature data of each face.

The image retrieving unit 12b retrieves image data in which the same person as a person who appears in an image of the registration image data appears. For example, the image retrieving unit 12b compares the feature data of the face of the registration image with the feature data of the face of the image data which is registered in the image database 211, to calculate the similarity of the faces. Further, the image retrieving unit 12b sets image data in which the similarity becomes a predetermined value or more, to the image data in which the same person as the person who appears in the registration image appears.

Further, the image retrieving unit 12b retrieves the image which relates to the registration image data, in addition to the image data in which the same person as the person who appears in the image of the registration image data appears. More specifically, the image retrieving unit 12b obtains an image ID, photographing date and time, GPS latitude and longitude of the registration image data from the image database 211 and compares the obtained information with an image ID of other image data which is registered in the image database 211, photographing date and time, and GPS latitude and longitude. In this respect, the image data which is a target (retrieving target data) is limited to image data which is not retrieved in the retrieving process by the face recognition. Moreover, according to the comparison, the image retrieving unit 12b determines whether the following conditions are satisfied, for example, (1) information on a portion of an image ID indicating identification information of the type of a camera of the retrieving target data matches that of the registration image data;

(2) photographing date and time (or photographing date) of the retrieving target data matches that of the registration image data (or the photographing date and time of the retrieving target data falls within a predetermined range, for example, determined based on the photographing date and time of the registration image data such as the same date, the same month, the range defined by a given time period before and/or after the photographing date and time of the registration image data); and (3) difference in the GPS latitude between the retrieving target data and the registration image data falls within a predetermined value or less, and difference in the GPS longitude between the retrieving target data and the registration image data falls within a predetermined value or less.

Further, the image retrieving unit 12b retrieves as a relating image an image satisfying a predetermined condition (for example, one predetermined condition, two combined predetermined conditions, or all three conditions) among the above conditions.

For example, in the case that the image satisfying all the conditions of (1) to (3) is the relating image, an image photographed at the same date and in the same location using the same camera as the camera which was used for photographing the registration image is retrieved. Further, in the case that the image satisfying the condition (2) and the condition (3) is the relating image, an image photographed at approximately the same photographing date and time and in approximately the same photographing location is retrieved (for example, in the case that a group of friends in the same location performs photographing using their own cameras, respectively). In addition, in the case that the image satisfying the condition (3) is the relating image, an image photographed in approximately the same location is retrieved (for example, in the case that the photographing is performed while staying for a long time in a certain location). Moreover, when the image satisfying only the condition (1) is the relating image condition, an image which is photographed using the camera used for photographing the registration image is retrieved (for example, in the case that the photographing is performed by one camera when going on a trip for a long time while moving areas one after another). Further, the image satisfying any one condition may be the relating image condition, or the image satisfying any two conditions may be the relating image.

Further, the image retrieving unit 12b retrieves image data which relates to the image data retrieved by the retrieving process according to the face recognition. The retrieving method is the same as that of the comparison of the attribute information. According to the series of retrieving processes, the image in which the same person as the person who appears in the registration image appears is retrieved, and simultaneously, an image relating to the image in which the same person appears with respect to photographing is retrieved.

The image display control unit 12c displays on the monitor 18 a plurality of images corresponding to a plurality of image data which includes registration image data of the other party for communication and relating image data, and the image data which is retrieved by the image retrieving unit 12b. As types of the display of the plurality of images, there are a slideshow display and a multi-display. The slideshow display is a type where the plurality of images is sequentially (or randomly) displayed one by one at a predetermined time interval. Further, the multi-display is a type where the plurality of images is simultaneously displayed. These display types may be set by user selection as desired. In addition, in the case that the number of images for performing the multi-display is too many, or in the case of user setting, the images may be sequentially displayed by a predetermined number of 2 or more. Such a display type may be a combination of the slideshow display and the multi-display. Furthermore, the image display control unit 12c continues such an image display until the line is disconnected (phone call completion) after retrieving the image data by the image retrieving unit 12b. Moreover, the image display may be performed only before starting the phone call or may be performed only after starting the phone call.

2. Operation of Telephone

Next, an operation of the telephone 1 according to the embodiment will be described with reference to FIGS. 4 and 5.

Figure 4:
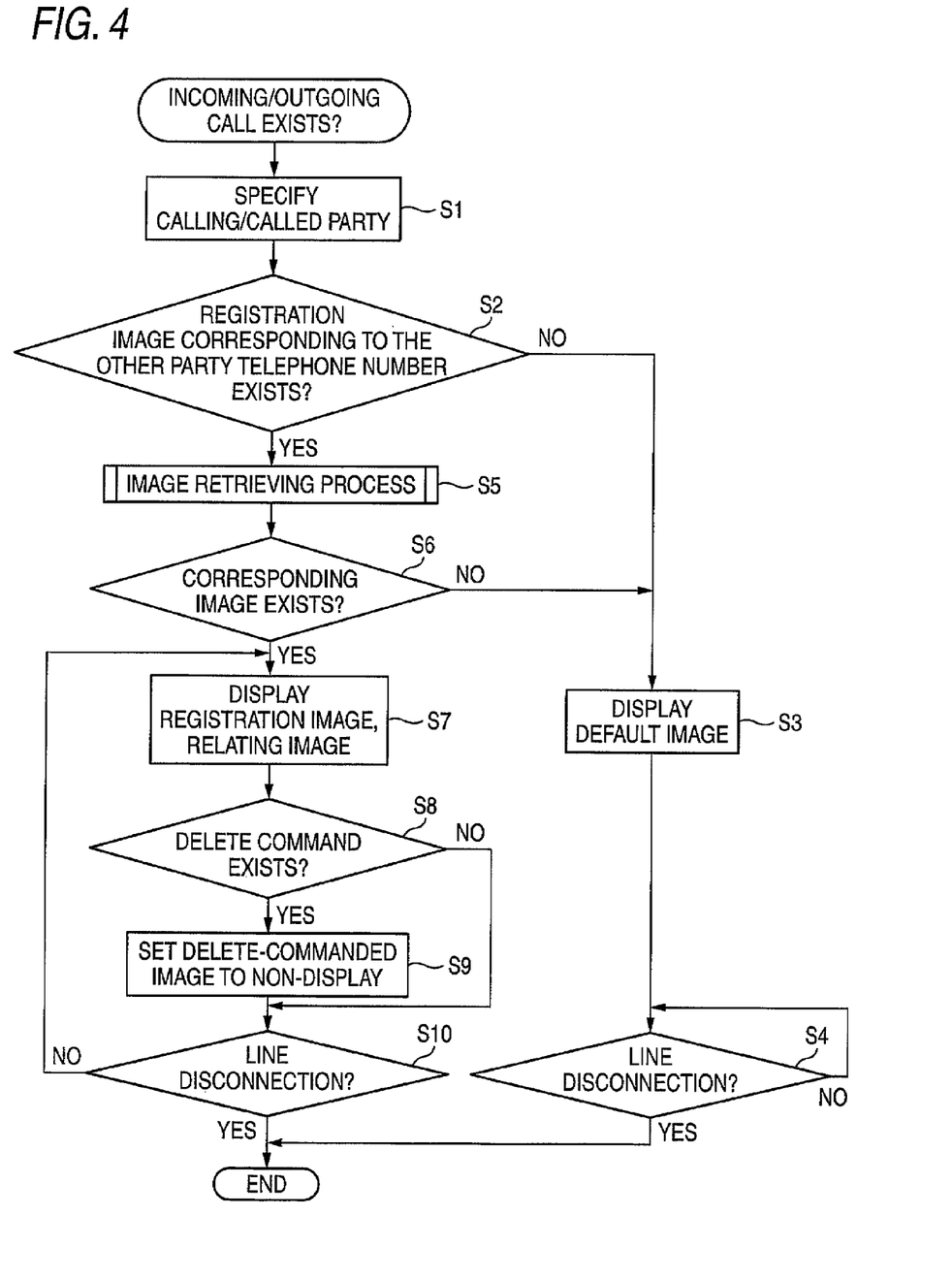
FIG. 4 is a flowchart illustrating an example of a process which is performed by a control unit in a telephone according to the embodiment.

The operation in FIG. 4 starts, for example, when an incoming call or outgoing call is detected, that is, when the communication unit 12a receives a calling signal through the telephone line C, or when it is detected that the telephone number is input by selection of a registrant from an address book or a outgoing/incoming call history or by dial manipulation by a user. Firstly, the communication unit 12a specifies the other party of the detected incoming or outgoing call (step S1). Specifically, when the incoming call is detected, the communication unit 12a obtains a caller's telephone number which is set to a MODEM signal or the like received before the calling signal as the other party telephone number. When the outgoing call is detected, the communication unit 12a obtains the dialed telephone number as the other party telephone number. Further, the communication unit 12a retrieves the other party which is registered in the address book database 212 using the other party telephone number.

Then, the image retrieving unit 12b determines whether the registration image data corresponding to the other party telephone number exists (step S2). Specifically, the image retrieving unit 12b determines whether the registration image ID corresponding to the other party telephone number is registered in the address book database 212.

At this time, in the case that the registration image ID corresponding to the other party telephone number is not registered, the image retrieving unit 12b determines that the registration image data corresponding to the other party telephone number does not exist (step S2; NO), and the image display control unit 12c performs display of a default screen at the time of a phone call (step S3). Specifically, the image display control unit 12c displays on a screen the other party telephone number and the name of the other party registered in the address book database 212. Further, the image display control unit 12c displays the communication time on the screen in addition to the other party telephone number and name after starting communication with the other party. Moreover, the default image may be registered by user setting or the like. In this case, the image display control unit 12c further displays the registered default image on the screen. Further, in the case that the other party telephone number is not registered in the address book database 212, since the registration image data is not registered, the image display control unit 12c further performs display of the default screen in this case. However, in this case, the name is not displayed and a registration button of the telephone number is displayed. The user may select the registration button to thereby additionally register the other party telephone number in the address book database 212. In addition, if the incoming call does not contain the caller's telephone number such as the incoming call with calling number delivery blocking, since the telephone 1 can not obtain the other party telephone number, the image display control unit 12c performs a default screen display such as an image or information, etc., which is previously registered by user setting or the like. In this case, registration to the address book database 212 cannot be performed.

Next, the communication unit 12a determines whether the line is disconnected (step S4). That is, the communication unit 12a determines whether hanging up by the user is detected, or a disconnection signal is received through the telephone line C. In this respect, in the case that the line is not disconnected (step S4; NO), the communication unit 12a continuously monitors disconnection of the line (step S4); and in the case that the line is disconnected (step S4; YES), the image display control unit 12c returns the image display to a display at a standby time (for example, a predetermined menu display or the like), and then terminates the procedure. The line connection (call starting) may be performed at any timing from step S1 to right before step S4.

Meanwhile, the image retrieving unit 12b, in the case that the registration image ID corresponding to the other party telephone number is registered, determines that the registration image corresponding to the other party telephone number exists (step S2; YES), and performs the image retrieving process (step S5).

Figure 5:
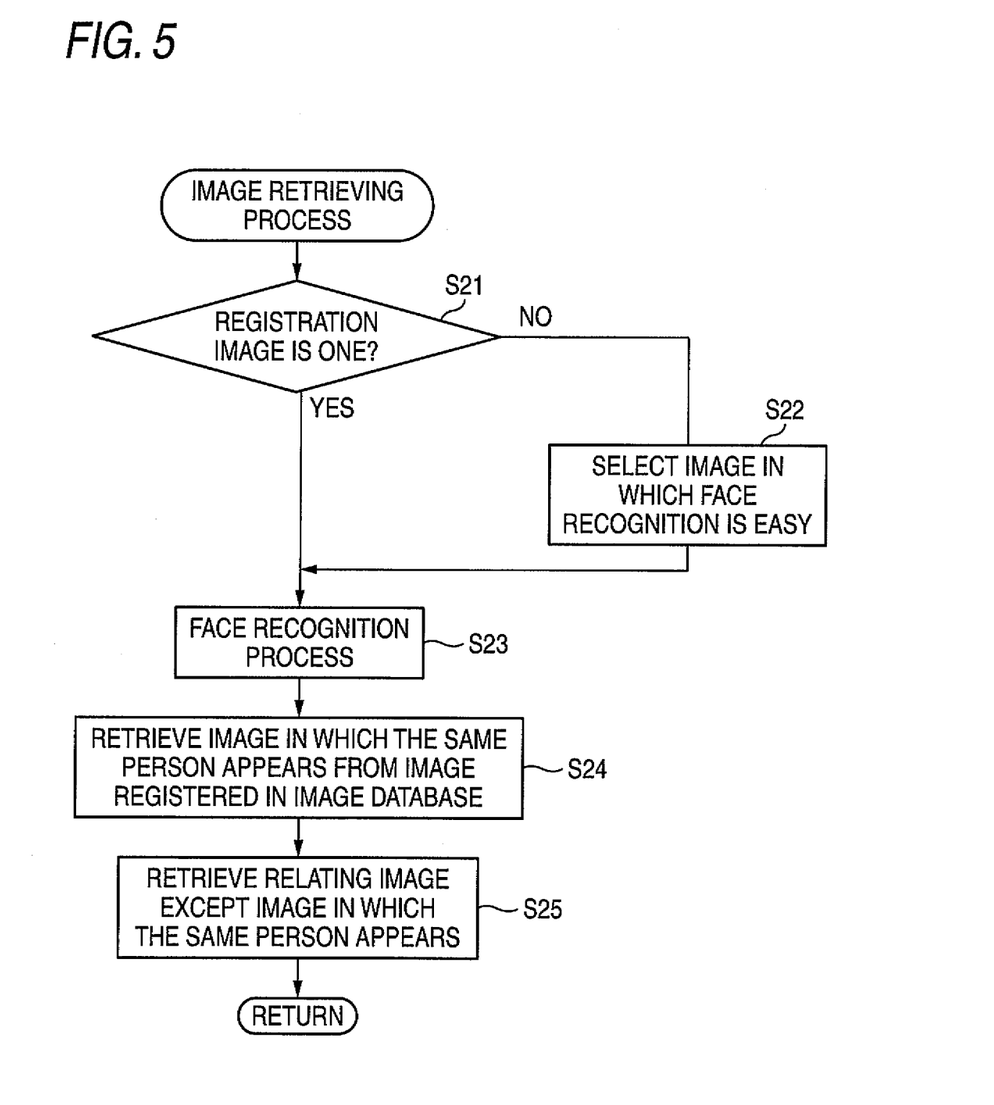
FIG. 5 is a flowchart illustrating an example of an image retrieving process which is performed by the control unit in the telephone according to the embodiment.

In the image retrieving process in FIG. 5, the image retrieving unit 12b firstly determines whether only one registration image data exists (step S21). Specifically, the image retrieving unit 12b determines whether the number of the registration image IDs registered in the address book database 212 corresponding to the other party telephone number is only 1. At this time, the image retrieving unit 12b, in the case that a plurality of the registration image data exists (step S21; NO), selects image data in which the face can be easily recognized among the plurality of registration image data (step S22).

The image retrieving unit 12b, in the case that image data in which the face is easily recognized from the plurality of registration image data is selected (step S22), or in the case that only one piece of registration image data exists (step S21; YES), performs the face recognition process (step S23). In the face recognition process, the image retrieving unit 12b sets the selected registration image data or only one piece of registration image data to reference image data, and performs the face recognition with respect to the reference image data. Further, the image retrieving unit 12b performs the face recognition for the image data which is registered in the database.

Next, the image retrieving unit 12b retrieves, from the image data which are registered in the image database 211, image data in which the same person as the person who appears in the reference image data appears (step S24). Specifically, the image retrieving unit 12b compares feature data of a face of the registration image data with feature data of a face of the image data which is registered in the image database 211, to calculate the similarity of the faces, and sets the image data having the similarity of a predetermined value or more to image data in which the same person as the person who appears in the registration image data appears.

Next, in addition to the image data in which the same person as the person who appears in the reference image data appears, the image retrieving unit 12b retrieves the image data which relates to the image data (including the registration image data and image data retrieved in step S24, except the reference image data) in which the corresponding person appears, based on the image ID, the photographing date and time and the GPS latitude and longitude which are registered in the image database 211 (step S25).

If the above process is terminated, the image retrieving unit 12b terminates the image retrieving process.

Next, the image retrieving unit 12b determines whether the relating image data which relates to the registration image data is retrieved in the image retrieving process in step S25 (step S6). In this respect, in the case that the relating image data which relates to the registration image data is not retrieved (step S6; NO), the image display control unit 12c performs the default screen display at the time of a phone call (step S3). In this case, the registration image data corresponding to the other party telephone number may be displayed.

Meanwhile, in the case that the relating image data which relates to the registration image data is retrieved (step S6; YES), the image display control unit 12c performs screen display of the registration image data and the relating image data (step S7). Specifically, the image display control unit 12c performs the slideshow display, the multi-display or the like. The image data in which the non-display flag is set to ON is not displayed.

Next, the control unit 12 determines whether a delete command of the retrieved image is performed by the user (step S8). In this embodiment, the user may designate an undesired image from the retrieved image for non-display. For example, the user selects an image which is actually displayed by the slideshow display or the multi-display, or the user selects the image among a list of retrieved images which is displayed, to thereby perform the delete command. In this respect, in the case that the delete command of the retrieved image exists (step S8; YES), the control unit 12 sets the delete-commanded image to non-display (step S9). Specifically, the control unit 12 sets the non-display flag corresponding to the image ID of the delete-commanded image to ON. The delete command becomes efficient from the next incoming or outgoing call.

The communication unit 12a, in the case that the delete-commanded image is set to the non-display (step S9), or in the case that the delete command of the retrieved image does not exist (step S8; NO), determines whether the line is disconnected (step S10). In this respect, the communication unit 12a, in the case that the line is not disconnected (step S10; NO), performs image display (step S7). For example, in the case of the slideshow display, the image display control unit 12c changes the image to be displayed. Meanwhile, in the case that the line is disconnected (step S10; YES), the image display control unit 12c returns the screen display to display at the time of standby, and then terminates the procedure. The line connection may be performed at any timing from step S1 to right before step S10.

As described above, according to the embodiment, the image retrieving unit 12b retrieves relating image data from the image data registered in the image database 211 when an outgoing call is made to or an incoming call is received from the telephone device 3 through the telephone line C. The relating image data relates to the registration image data which corresponds in advance to the other party of the incoming or outgoing call. The image display control unit 12c controls the monitor 18 to display the images respectively corresponding to the plurality of image data including the registration image data and the relating image data.

If the image data which relates to the registrant corresponds as the registration image data, it is highly probable that the relating image data which relates to the registration image data is also the image data which relates to the registrant. Further, if contents of the storage unit 21 vary from the previous retrieving time due to an additional storage, deletion or the like of the image data, the retrieving result of the image data which relates to the registration image data may also vary from the previous retrieving time. Accordingly, if the user additionally stores some image data in the storage unit 21, relating image data is newly retrieved from the image data. Further, if at least one piece of image data which is stored in the storage unit 21 is deleted, in the case that the relating image data exists among the deleted image data, the image data is not retrieved next time. That is, in order to vary the image to be displayed in the monitor 18, even though the user does not perform a laborious registration process for making the relating image data correspond to the registrant, the relating image data may be retrieved and may be displayed in the monitor 18 with the storage unit 21 being in an updated storage state, thereby preventing the user from becoming discontent with the displayed image.

Further, since the image display control unit 12c displays the corresponding image and the relating image in the slideshow display and the multi-display, the user can enjoy a variety of image data at the time of outgoing call or incoming call.

In addition, since the image display control unit 12c displays the corresponding image and the relating image until a phone call is terminated, the user can talk with the other party while watching the registration image or the relating image during the phone call.

Moreover, since the image retrieving unit 12b extracts an image of a person's face from the registration image data, and retrieves, based on the extracted image of the person's face, the relating image data which includes the image of the same person as the person whose face the image indicates if the user registers the image in which the registrant's face appears as the registration image corresponding to the registrant, any other image in which the registrant appears can be displayed.

Further, since the image retrieving unit 12b obtains attribute information of the image data registered in the image database 211 and compares the attribute information of the registration image data with the attribute information of the image data registered in the image database 211 to retrieve the relating image data, the image which relates to the registration image can be displayed in a variety of conditions according to the attributes of the image.

In particular, in this embodiment, the attribute information includes the image ID, the photographing date and time, and the GPS latitude and longitude. Since the image retrieving unit 12b retrieves, among the image data registered in the image database 211, relating image data satisfying at least one predetermined condition of the following three conditions: (1) Does the information on a portion of an image ID indicating identification of a camera coincide with that of the registration image data?; (2) Does the photographing date and time (or photographing date) coincide with that of the registration image data? (or Does the photographing date and time falls within a predetermined range?); and (3) Do differences between the GPS latitude and longitude those of the registration image data, respectively, fall within a predetermined range?, an image photographed at the substantially same time and in the substantially same location can be displayed using the same camera as the camera used for photographing of the registration image.

In the above described embodiment, a phone call is made using the telephone 1 (main device), a phone call may be made using the interior cordless handset 4. Herein, in the case that the user dials with interior cordless handset 4 or receives an incoming call with the interior cordless handset 4, the user may not be close to the telephone 1, and thus, the effect may be wasted even though the registration image and the relating image are displayed. Accordingly, in this case, the registration image and the relating image need not be displayed.

Specifically, at the time of making an outgoing call, in the case that the user dials with the telephone 1, the control unit 12 performs the process as disclosed in the embodiment, and in the case that the user dials with the interior cordless handset 4, the control unit 12 controls display and non-display of the registration image and the relating image according to whether the interior cordless handset 4 is located next to the telephone 1. Meanwhile, at the time of receiving an incoming call, until pick-up is actually detected, it cannot be recognized that the user receives the incoming call from any one of the telephone 1 and the interior cordless handset 4. Accordingly, in this case, the control unit 12 starts display of the registration image and the relating image in order to easily recognize the person who is calling, and then continues the image display in the case that the telephone 1 receives an incoming call. Further, the control unit 12 continues or stops the image display according to whether the interior cordless handset 4 is located next to the telephone 1 in the case that the interior cordless handset 4 receives an incoming call. Further, the control unit 12 controls display and non-display of the registration image and the relating image according to whether the interior cordless handset 4 is located next to the telephone 1 during a phone call.

As a method for determining whether the interior cordless handset 4 is located next to the telephone 1, for example, the control unit 12 may measure the distance between the telephone 1 and the interior cordless handset 4, based on delay or the like of a signal transmitted/received between the telephone 1 and the interior cordless handset 4, and may perform control based on the distance. Alternatively, for example, it may be configured such that the interior cordless handset 4 emits an infrared light and the telephone 1 receives the infrared light, the control unit 12 may perform control to determine whether the telephone 1 receives the infrared light from the interior cordless handset 4.

Further, in the case that the interior cordless handset 4 has a monitor, the registration image and the relating image may be displayed on the monitor of the interior cordless handset 4. In this case, a process such as retrieving of the relating image may be performed in the telephone 1, and the interior cordless handset 4 may receive the registration image and the relating image from the telephone 1 to perform display only. Alternatively, the interior cordless handset 4 may further perform the process of the retrieving of the relating image in addition to the display. In this case, when the user is calling with the interior cordless handset 4, since the user cannot watch the monitor, the registration image and the relating image may be displayed only when performing a phone call with the interior cordless handset 4 being in a handsfree (speaker phone) state.

In addition, in the embodiment, the image display control unit 12c performs control to display on the monitor 18, all the plurality of images which includes the registration image and the image retrieved by the image retrieving unit 12b, but the images to be displayed may be narrowed down in range. For example, only an image photographed in the same month (an example of a predetermined range) as the current month may be displayed. According to such an example, since an image in which the user is photographed in the current month or the same month in the previous year or earlier (an image in which the other party appears at that time, an image in which the user and the other party are photographed together at that time, or the like) are displayed, the user can recall memories from the same month as the current time while watching the image, and use the memories as a topic to enliven the conversation with the other party. To this end, the image display control unit 12c may refer to the photographing date and time which is registered in the image database 211.

Further, in this embodiment, in order to specify (recognize) a person who appears in the image, the image retrieving unit 12b extracts an image of a face portion from the image data to perform face recognition, but the person specification is not limited to the face recognition. In addition, an image of a predetermined target (for example, a cat or the like) by the image recognition is extracted by the registration image, an image which includes an image of the same kind of target (for example, in the case that the target is a cat, the same kind of cat or the like) may be retrieved as the relating image.

Moreover, in this embodiment, the image retrieving unit 12b further retrieves the image data which relates to the image data retrieved by the retrieving process by the face recognition, but this retrieving process may be omitted.

In addition, the attribute information is not limited to the above described embodiment. For example, the attribute information may include a title, a comment, a keyword or the like of the image data. Further, the attribute information of the registration image data may be compared with the attribute information of the image data of the retrieving target, to thereby retrieve the relating image data (for example, in the case of retrieving image data in which the registration image data and a part of a keyword coincide with each other).

Further, in the embodiment, from the time of ringing before starting conversation to call termination, the registration image and the relating image are displayed in the slideshow and the multi-display, but the registration image of the other party may be displayed before starting the conversation, and the relating image may be displayed in the slideshow and multi-display after starting the conversation. Accordingly, if a photograph image in which a face or the like of the registrant appears is registered as the registration image, the user can recognize the other party before staring the conversation, and can talk with the other party while watching the relating image after starting the conversation.

What is claimed is:

1. A communication apparatus comprising:
a storage unit configured to store a plurality of images therein;
a display unit configured to display at least one of the plurality of images;
a retrieving unit configured to, when an outgoing call is made to or an incoming call is received from another communication apparatus, determine a corresponding image associated with the other party of the outgoing or incoming call, and retrieve a relating image from the images stored in the storage unit by comparing attribute information of the corresponding image with attribute information of the plurality of images stored in the unit, wherein the attribute information is image capturing device information, the corresponding image being different from the relating image, the corresponding image comprising an image of a person's face, and the relating image comprising another image of the person's face; and
a display control unit configured to perform control to display at least one of the corresponding image and the retrieved relating image on the display unit.

2. The communication apparatus according to claim 1, wherein the communication apparatus includes a telephone apparatus in which the outgoing call is made to or the incoming call is received from other communication apparatus through a telephone line.

3. The communication apparatus according to claim 1, wherein the attribute information of the corresponding image is camera identification information indicating a camera used for photographing the corresponding image.

4. An image display method for a communication apparatus that comprises a storage unit configured to store a plurality of images and a display unit configured to display the images, said method comprising:
determining, when an outgoing call is made to or an incoming call is received from another communication apparatus, a corresponding image associated with the other party of the outgoing or incoming call;
retrieving a relating image from the images stored in the storage unit, wherein the relating image is related to the corresponding image by comparing attribute information of the corresponding image with attribute information of the plurality of images stored in the unit, wherein the attribute information is image capturing device information, the corresponding image being different from the relating image, the corresponding image comprising an image of person's face, and the relating image comprising another image of the person's face; and
performing control to display at least one of the corresponding image and the retrieved relating image on the display unit.

5. The image display method according to claim 4, wherein the communication apparatus includes a telephone apparatus in which the outgoing call is made to or the incoming call is received from other communication apparatus through a telephone line.

6. The image display method according to claim 4, wherein the attribute information of the corresponding image is camera identification information indicating a camera used for photographing the corresponding image.

7. A non-transitory computer readable medium having an image display processing program readable by a computer and enabling, when executed by the computer, the computer to perform operations of a communication apparatus that comprises a storage unit configured to store a plurality of images and a display unit configured to display the images, said operation comprising:
determining, when an outgoing call is made to or an incoming call is received from another communication apparatus, a corresponding image associated with the other party of the outgoing or incoming call;
retrieving a relating image from the images stored in the storage unit, wherein the relating image is related to the corresponding image by comparing attribute information of the corresponding image with attribute information of the plurality of images stored in the unit, wherein the attribute information is image capturing device information, the corresponding image being different from the relating image, the corresponding image comprising an image of a person's face, and the relating image comprising another image of the person's face; and
performing control to display at least one of the corresponding image and the retrieved relating image on the display unit.

8. The non-transitory computer readable medium according to claim 7,
wherein, when retrieving the relating image, a target image, which is an image of a target object, is extracted from the corresponding image, and the relating image, which includes at least one of an image of a same object as the target object and an image of a same kind of object as that of the target object, is retrieved based on the target image.

9. The non-transitory computer readable medium according to claim 7,
wherein, when retrieving the relating image, attribute information of the images stored in the storage unit is obtained, and attribute information of the corresponding image is compared with the attribute information of the images stored in the storage unit so as to retrieve the relating image.

10. The non-transitory computer readable medium according to claim 9, wherein the attribute informing includes at least one of information of a type of a camera, and information of a photographing date and time.

11. The non-transitory computer readable medium according to claim 9,
wherein the attribute information includes at least one of camera identification information indicating a camera used for photographing the image, photographing time information indicating a time at which the image is photographed, and photographing location information indicating a photographing location of the image, and
wherein the relating image, in which it is determined that content of the attribute information is within a predetermined range with respect to content of the attribute information of the corresponding image, is retrieved.

12. The non-transitory computer readable medium according to claim 11,
wherein the attribute information includes the photographing location information, and
wherein the relating image, in which it is determined that a difference in the latitude between the corresponding image and the relating image is within a predetermined value, and a difference in the longitude between the corresponding image and the relating image is within a predetermined value, is retrieved.

13. The non-transitory computer readable medium according to claim 7,
wherein said operations further comprise obtaining month/date information indicating month and date when the corresponding image and the relating image are respectively photographed, and extracting, from the corresponding image and the relating image, image in which the month and date indicated by the month/date information are within a predetermined range which includes month and date at a current point of time,
wherein the extracted image is displayed on the display unit.

14. The non-transitory computer readable medium according to claim 7,
wherein, when displaying the plurality of images of at least one of the corresponding image and one or more relating images, the plurality of images are sequentially displayed on the display unit per a predetermined number of image groups or the plurality of images are simultaneously displayed on the display unit.

15. The non-transitory computer readable medium according to claim 7,
wherein the operations further comprise registering a telephone number of a registrant registered in advance as the party in association with the corresponding image,
wherein, when the telephone number of the other call party is not registered in the registering unit, a predetermined image is displayed on the display unit.

16. The non-transitory computer readable medium according to claim 7,
wherein the corresponding image is displayed on the display unit before the communication apparatus and the other communication apparatus are connected to each other, and the retrieved relating image is displayed on the display unit after the communication apparatus and the other communication apparatus are connected to each other.

17. The non-transitory computer readable medium according to claim 7,
wherein at least one of the corresponding image and the retrieved relating image are displayed on the display unit until a telephone call with the other party terminates.

18. The non-transitory communication apparatus according to claim 7,
wherein, when retrieving the relating image, face recognition is performed with respect to the corresponding image, and the relating image is retrieved from a storage unit using the result of the face recognition.

19. The non-transitory computer readable medium according to claim 7,
wherein the communication apparatus includes a telephone apparatus in which the outgoing call is made to or the incoming call is received from other communication apparatus through a telephone line.

20. The non-transitory computer readable medium according to claim 7,
wherein the attribute information of the corresponding image is camera identification information indicating a camera used for photographing the corresponding image.

* * * * *